Patented May 23, 1944

2,349,331

UNITED STATES PATENT OFFICE 2,349,331

CELLULOSE DERIVATIVE COMPOSITION AND ITS USE

Bjorn Andersen, Maplewood, Ernst A. Grenquist, Bloomfield, and Ralph H. Ball, Cranford, N. J., assignors, by mesne assignments, to Celanese Corporation of America, a corporation of Delaware No Drawing. Application November 19, 1936,
Serial No. 111,594

7 Claims. (Cl. 106—181)

This invention relates to the preparation of compositions containing derivatives of cellulose containing acetonyl or other ketonyl esters as plasticizers or softening agents.

An object of our invention is to prepare compositions such as plastic or liquid coating compositions and particularly molding compositions, containing derivatives of cellulose wherein an acetonyl or other ketonyl ester is employed as a plasticizer. A further object of our invention is to form objects from such compositions and molding them under heat and pressure. Other objects of our invention will appear from the following detailed description.

We have found that acetonyl or other ketonyl esters are capable of forming solutions with derivatives of cellulose and are excellent solvents, swelling agents, plasticizers, softening agents, or camphor substitutes for use in conjunction with derivatives of cellulose to impart softness, pliability and other desirable properties to plastics, films, textiles and other materials containing derivatives of cellulose.

These acetonyl or other ketonyl esters dissolve cellulose acetate or other cellulose derivatives at relatively low temperatures and also at a relatively high rate. Moreover they are relatively non-volatile, and do not tend to evaporate readily even at relatively high temperatures. These properties render them particularly useful as plasticizers for cellulose derivative molding compositions that are molded under heat and pressure, particularly by the extrusion or injection molding process where the composition is heated and extruded or injected into a closed mold, since their high solvent power for the cellulose derivative permits ready solvation or solution under the conditions prevailing, and yet they do not tend to volatilize appreciably at the elevated temperatures prevailing during molding as to cause brittleness in the final molded article.

Another important property of some of the acetonyl or other ketonyl esters is their ability to form cellulose derivative compositions of low moisture absorption. For instance in the ester-type of plasticizer, the presence of a hydrocarbon radical containing several carbon atoms contributes to lower moisture absorption, but such esters, e. g. dibutyl phthalate, butyl phthalyl butyl glycollate, etc. have little or no solvent power for cellulose acetate. We have found that if, for instance, one of the butyl groups of dibutyl phthalate is replaced by acetonyl, the resulting compound, butyl acetonyl phthalate suitably purified, has good solvent power for cellulose acetate, and yet imparts to cellulose acetate sheets or films a reduced moisture absorption. To the best of our knowledge none of the butyl phthalates heretofore described are active solvents for cellulose acetate.

In accordance with our invention, then, we prepare compositions containing derivatives of cellulose and an acetonyl or other ketonyl ester as plasticizer or softening agent.

The ester employed in accordance with this invention is an ester of an acid with an acetonyl group, $CH_3COCH_2$— or any other suitable ketonyl group; that is a group corresponding to a ketone such as diethyl ketone, methyl ethyl ketone minus one hydrogen atom. The esters of diacetone alcohol

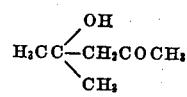

are also included among the compounds of this invention.

The acid radical of the acetonyl or other ketonyl ester may be any suitable one but is preferably an aliphatic or aromatic carboxylic acid. Such acid may be mono-basic, such as benzoic acid, naphthoic acid, propionic acid, butyric acid, lactic acid, hydroxy butyric acid or stearic acid; or it may be di- or polybasic such as phthalic acid, malonic acid, succinic acid, oxalic acid, tartaric acid, citric acid or trimesic acid.

The acetonyl ester of a monocarboxylic acid may be represented by the formula

where R is an aliphatic or aromatic residue. An example of such ester is acetonyl benzoate; $C_6H_5COO.CH_2COCH_3$.

If a polycarboxylic acid is employed in making the ester, one or more of the carboxylic hydrogens thereof may be replaced by the acetonyl or other ketonyl group, while any remaining carboxylic hydrogens may be replaced by any other desired groups such as methyl, ethyl, propyl, isopropyl, butyl, isobutyl, secondary butyl, normal amyl, secondary amyl, or other alkyl group, the residues of simple or poly glycols or their partial ethers and esters, such as mono methyl glycol (methoxy ethyl-), mono ethyl diethylene glycol, phenoxyethyl, aromatic groups, such as phenyl, cresyl, xylenyl, benzyl, etc.

For example, in the case of the esters of phthalic acid these may be represented by the general formula

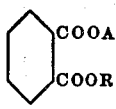

where A represents the acetonyl group and R represents either the acetonyl group or any of the alkyl, alkoxy alkyl, aryl, aroxy alkyl or aralkyl groups above mentioned.

Specific examples of mixed acetonyl esters of phthalic acid that are embraced in this invention are methoxy ethyl acetonyl phthalate

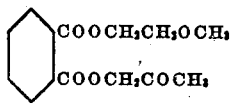

and butyl acetonyl phthalate

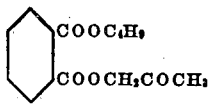

As explained above, the butyl acetonyl phthalate imparts to cellulose acetate plastics a high resistance to moisture absorption and other desirable properties due to its high stability, solvent action, etc.

Any suitable derivative of cellulose may be employed in conjunction with the acetonyl esters, such as cellulose nitrate, but we prefer to employ organic derivatives of cellulose, such as organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. Mixed cellulose esters, such as cellulose acetate-nitrate or cellulose acetate-butyrate, mixed cellulose ethers, or mixtures of the various cellulose derivatives may also be employed.

Plastic compositions containing the derivative of cellulose and the acetonyl or other ketonyl esters may be made in any suitable manner and they may be worked up into sheets, rods, tubes, blocks or any other desired shape.

Molding powder or other compositions containing the derivative of cellulose and the acetonyl or other ketonyl ester in intimate association but containing little or no volatile solvent may be made, and these powders may be molded under heat and pressure to any desired shape. As has been previously indicated, the use of such molding powder or other composition in injection or extrusion molding processes, whenever the powder is heated and then forced through a small opening into a closed mold, is particularly important since at the prevailing elevated temperature, acetonyl or other ketonyl esters have a low volatility and a high and rapid solvent action on the cellulose derivative.

Filaments, yarns and other textile materials may be made from solutions containing a derivative of cellulose and the acetonyl or other ketonyl esters by extrusion through orifices into an evaporative atmosphere, as in dry spinning, or into a precipitating bath as in wet spinning.

Solutions of the organic derivative of cellulose and the acetonyl or other ketonyl esters in a volatile solvent may be cast or extruded onto a smooth surface and the volatile solvent permitted to evaporate to form durable films or foils of improved tensile properties, moisture and surface resistance that may be used for photographic wrapping or other purposes. Another useful application of this invention is in the preparation of laminated glass wherein a plastic sheet containing the derivative of cellulose and the acetonyl or other ketonyl ester is interposed between sheets of glass, suitable proportions for this purpose being 50 to 100 parts by weight of the ketonyl ester per 100 parts of cellulose derivative. Coating compositions such as lacquers may be formed containing the derivative of cellulose and the acetonyl or other ketonyl ester dissolved in appropriate solvent mixtures, and resins, either synthetic or natural, compatible with the derivative of cellulose may be added thereto.

The proportion of the acetonyl or other ketonyl ester to the derivative of cellulose may be varied in accordance with the particular requirements. Generally we have found that in the case of its use with cellulose acetate the acetonyl or other ketonyl ester may be employed in amounts of 10% or less to 60% or more of the weight of the cellulose acetate.

In making the compositions in accordance with our invention, the acetonyl or other ketonyl ester may be employed as the sole plasticizing agent, or it may be used in conjunction with other plastifiers such as triacetin, triglyceryl propionate, dibenzyl tartrate, diethyl tartrate, dibutyl tartrate, dimethyl phthalate, diethyl phthalate, the phthalate of the mono methyl ether of ethylene glycol, triphenyl phosphate, monomethyl diphenyl phosphate, tri beta chlor ethyl phosphate, etc.

Merely by way of example, the following proportions are cited as suitable ones, the proportions being those occurring in the finished product:

*Example I*

| | Parts by weight |
|---|---|
| Cellulose acetate | 100 |
| Butyl acetonyl phthalate | 30 |

*Example II*

| | Parts by weight |
|---|---|
| Cellulose acetate | 100 |
| Butyl acetonyl phthalate | 30 |
| Triphenyl phosphate | 12.5 |

*Example III*

| | Parts by weight |
|---|---|
| Cellulose acetate or cellulose nitrate | 100 |
| Methoxy ethyl acetonyl phthalate | 25 to 100 |

In making these compositions, solvents of appropriate nature, such as acetone, methyl acetate, ethylene formal, ethyl lactate, formal glycerol, diacetone alcohol, of varying boiling points may be used to suit the particular requirements. Effect materials such as pigments, filling materials or dyes may be added to produce any desired effect.

The term "polycarboxylic acid" as employed in the application is to be construed as including within its scope a dicarboxylic acid.

It is to be understood that the foregoing detailed description is given merely by way of illustration, and that many variations may be made therein without departing from the spirit of our invention.

Having described our invention, what we desire to secure by Letters Patent is:

1. A composition of matter containing a derivative of cellulose and, as plasticizer, a compound selected from the group consisting of butyl acetonyl phthalate and methoxy ethyl acetonyl phthalates.

2. A composition of matter containing cellulose acetate and, as plasticizer, a compound selected from the group consisting of butyl acetonyl phthalate and methoxy ethyl acetonyl phthalates.

3. A composition of matter containing a stable derivative of cellulose and methoxy ethyl acetonyl phthalate.

4. A composition of matter containing cellulose acetate and methoxy ethyl acetonyl phthalate.

5. A composition of matter containing a derivative of cellulose and butyl acetonyl phthalate.

6. A composition of matter containing cellulose acetate and butyl acetonyl phthalate.

7. A composition embodying a cellulose derivative and containing, as a plasticizer, n-butyl-acetonyl phthalate.

BJORN ANDERSEN.
ERNST A. GRENQUIST.
RALPH H. BALL.